United States Patent
Gurfinkel

[11] Patent Number: 5,971,163
[45] Date of Patent: Oct. 26, 1999

[54] PORTABLE SEALABLE RECOVERY CONTAINER

[76] Inventor: Benjamin Gurfinkel, 6935 Condon Dr., San Diego, Calif. 92122

[21] Appl. No.: 09/109,566

[22] Filed: Jul. 2, 1998

[51] Int. Cl.[6] ................................................ C02F 1/40
[52] U.S. Cl. .................. 210/514; 210/532.1; 210/536; 210/538
[58] Field of Search .................. 210/513, 514, 210/532.1, 536, 538, 540

[56] References Cited

U.S. PATENT DOCUMENTS

| | | |
|---|---|---|
| 365,259 | 6/1887 | Ide . |
| 405,047 | 6/1889 | Newsome ............................ 210/536 |
| 654,965 | 7/1900 | Franke ............................... 210/540 |
| 782,065 | 2/1905 | Shaler . |
| 989,865 | 4/1911 | O'Connor .......................... 210/536 |
| 1,140,118 | 5/1915 | Collins . |
| 2,083,861 | 6/1937 | Padgett ............................. 210/536 |
| 2,762,511 | 9/1956 | Sternaman ........................ 210/55 |
| 3,080,057 | 3/1963 | Mobley ............................. 210/33 |
| 3,707,404 | 12/1972 | Carlson et al. ................... 134/10 |
| 3,804,252 | 4/1974 | Rishel ............................... 210/84 |
| 4,073,734 | 2/1978 | Lowrie .............................. 210/532 |
| 4,422,931 | 12/1983 | Wolde-Michael ................. 210/168 |
| 4,684,467 | 8/1987 | Cloud ............................... 210/532.1 |
| 4,876,011 | 10/1989 | Betts et al. ....................... 210/526 |
| 5,122,280 | 6/1992 | Russell et al. ................... 210/745 |
| 5,366,628 | 11/1994 | Utter ................................. 210/540 |
| 5,382,362 | 1/1995 | Lewis, Jr. ......................... 210/514 |

*Primary Examiner*—Christopher Upton
*Attorney, Agent, or Firm*—Frank G. Morkunas

[57] ABSTRACT

A portable sealable recovery container having a sealed interior space, a first inlet on a first top surface, a second inlet on a second top surface which functions as a top when the container is rotated to make the first top surface a side surface, a discharge member on a side surface with a first and a second conduit connected to the discharge member such that the second conduit extends from the discharge member in a planar relationship with the first top surface and its end is above the discharge member when the first top surfaces faces upward while the first conduit extends from the discharge member in a planar relationship with the second top surface and its end is above the discharge member when the second top surface faces upward, and sealing means for sealing any one of the first inlet, the second inlet, and the discharge member.

6 Claims, 1 Drawing Sheet

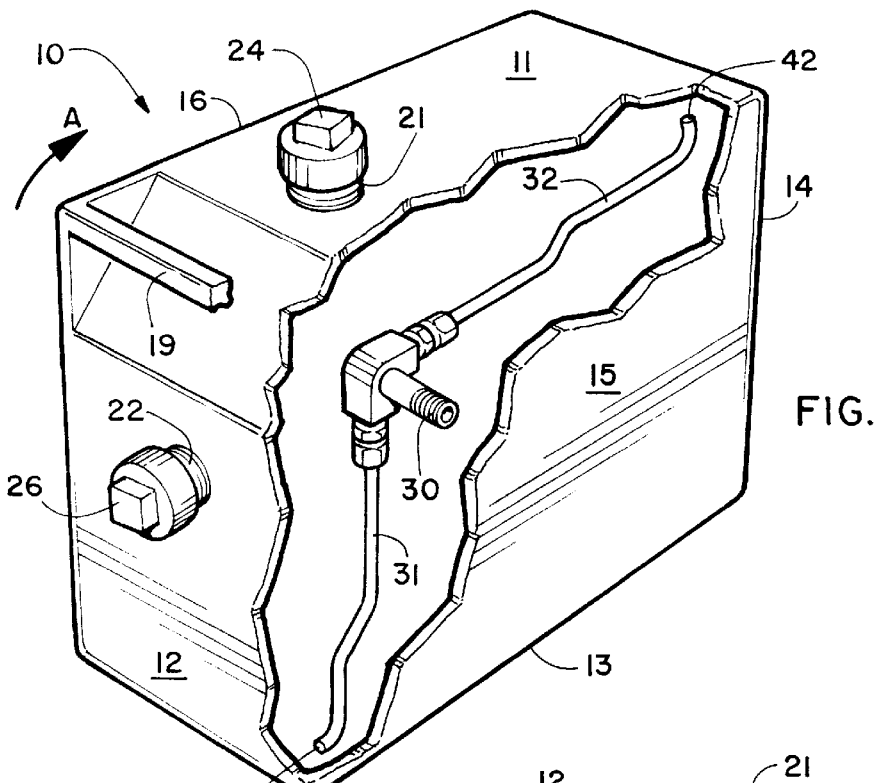
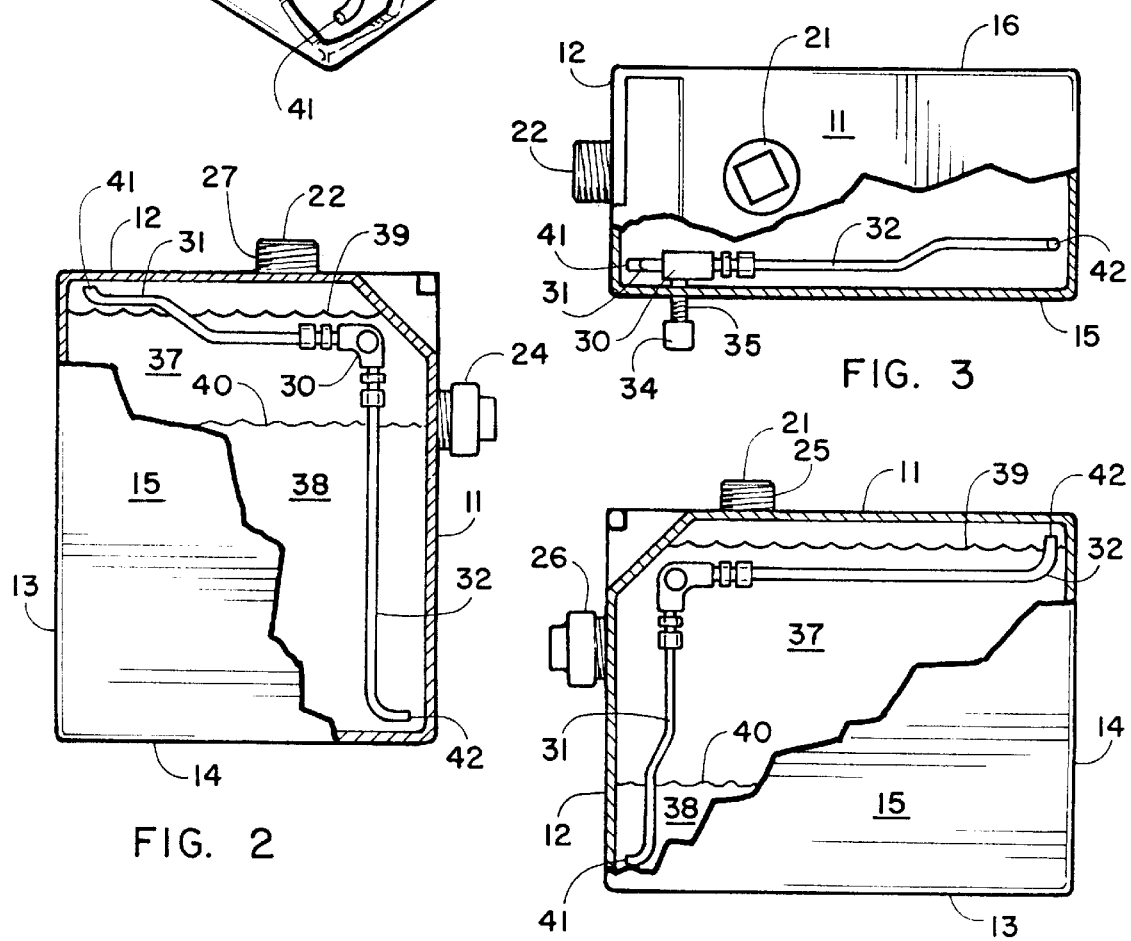
FIG. 1
FIG. 3
FIG. 2
FIG. 4

PORTABLE SEALABLE RECOVERY CONTAINER

BACKGROUND OF THE INVENTION

This present invention relates to an improvement in recovery containers, and more particularly to containers used in tramp oil or other effluent skimming operations for the purpose of recovering and recycling more usable fluids from the effluent mixture.

Industrial work which involves, but is not limited to, metal working such as fabrication, milling, tooling, machining, boring, parts cleaning, and the like, uses high-speed power tools for that purpose. A variety of industrial solutions are used to lubricate and to cool the work piece and the machine or tool associated with that work piece. Industrial solutions, such as coolants (i.e., cutting fluids or grinding fluids for example) are costly. When invariably, and unavoidably, tramp-oil or other undesirable effluents become mixed with industrial solution, the useful life of the industrial solutions is greatly diminished. A need exists to remove undesirable effluents from the industrial solution to permit re-use of as much industrial solution as possible.

The purpose of removing these undesirable effluents from another industrial solution is to maintain that industrial solution in a contamination-free state and to thereby reduce bacterial growth potential therein.

Effluents, such as tramp-oil, even in trace amounts, provides a food source for bacteria and thereby contributes to its growth. Because of such growth, the work place becomes filled with an undesirable rancid and foul-smelling order. Tramp-oil is also the source of smoke-mist and oil-mist in the work place. Quality of the work place suffers. These are valid health-related, environmental, and quality-of-life concerns for the well-being of the worker.

Quality of work is also affected by the presence of tramp-oil or other effluents. Tramp-oil reduces the useful life of the machine tool and the useful life of the industrial solution used in the machining process. It provides a means by which undesirable residues are retained in the work place and deposited on the work piece and the machine tool. Overall, the product suffers in time expended to produce it and in the quality of finished product itself. The presence of tramp-oils, and other undesirable effluents, also results in increased maintenance requirements in the work place. Tramp-oil is the scourge to industry and any efficient means of eliminating tramp-oil will greatly enhance the quality of finished products and quality of life in the work place for the machinist.

Generally, contaminated industrial solutions, even with trace amounts of contaminate, will last for a short period of time. After that, the contaminated fluid is disposed-of and replaced. The problems associated with this are two-fold. One is the cost for the proper packaging of the contaminated industrial solution and its proper disposal and another is the cost for new industrial solution. A third, indirect but associated problem is final disposal. In an already crowded ecosphere, limiting waste streams becomes crucial. Disposing of industrial solutions before their time adds to rather than decreases our waste stream.

Adding a bactericide to the industrial solution to kill the bacteria is yet another attempt at curing some problems associated with the presence of tramp-oil. In this cure, one problem was substituted for another since it was found that most bactericides irritated human skin. The problems associated with trace amounts of tramp-oil remain unabated.

Currently, apparatus (such as skimmers) are used in association with removing undesirable effluents and conveying the solution into a container or reservoir for decantation. Here the undesirable effluents separate out and rise to the top where they can be skimmed off and the industrial fluid or solution re-used. This process is cumbersome and requires additional skimming which general agitates the mixture and, to some extent, defeats the purpose. In many such processes, the container remains with the skimmer unit at all times causing an interruption in the overall operations and skimming process.

Other devices and methods employ various pumps and pumping techniques, one or more external tanks or containers, and numerous connections therebetween. These are costly to purchase, operate, and maintain. Additionally, these do not offer virtually continued operation; there must be a down-time to remove and replace the container which, with all the connections, becomes a lengthy task. Most containers used for this purpose are complex structures with baffles and weirs contained throughout. None is portable.

In this regard, reference is made to U.S. Pat. No. 365,259 issued on Jun. 21, 1887, to Ide; U.S. Pat. No. 782,065 issued on Feb. 7, 1905, to Shaler; U.S. Pat. No. 1,140,118 issued on May 18, 1915, to Collins; U.S. Pat. No. 2,762,511 issued on Sep. 11, 1956, to Sternaman; U.S. Pat. No. 3,080,057 issued on Mar. 5, 1963, to Mobley; U.S. Pat. No. 3,707,404 issued on Dec. 26, 1972, to Carlson, et. al.; U.S. Pat. No. 3,804,252 issued on Apr. 16, 1974, to Rishel; U.S. Pat. No. 4,073,734 issued on Feb. 14, 1978, to Lowrie; U.S. Pat. No. 4,422,931 issued on Dec. 27, 1983, to Wolde-Michael; U.S. Pat. No. 4,876,011 issued on Oct. 24, 1989, to Betts, et. al.; and U.S. Pat. No. 5,122,280 issued on Jun. 16, 1992, to Russell, et. al. Each relates to various apparatus and paraphernalia associate with liquid separation. Each are either complex, cumbersome, and costly; none is as portable, easily sealable, and easily transportable and versatile as is the present invention.

The present invention is well-suited for further and more easily removing water-resistant oils and oil-like substances (e.g., hydraulic oils, lubricants, and other undesirable oils-tramp oils) from water-miscible industrial solutions (generally coolant industrial solutions used by machine tools in metal cutting and grinding operations) and recycling those industrial solutions for re-use. It is self-contained, portable, and sealable. Where space is limited, the present invention can be positioned in more than one position, to accommodate cramped spaces, and still function as desired.

The portable container, however, is not limited to machine processing operations. On a larger scale, it can be used as a recovery source for any petroleum-based product or other undesirable effluent which is in suspension, or emulsified, in water or other oil-repellent industrial solutions such that greater quantities of industrial solutions are recoverable and, therefore, re-usable. In the case of parts' washing with water, the recovery container facilitates separation of grease or oil from water such that the water also is re-usable.

Accordingly, several objects and advantages of my invention are to:

provide a more efficient, effective, and less costly manner of recovering more usable solutions or fluids from effluents;

provide portability and versatility to current recovery systems;

permit positioning and using a recovery container in more than one position; and provide an environmentally friendly sealable re-usable recovery container.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a portable sealable recovery container having a sealed interior space, a first inlet on a first top surface, a second inlet on a second top surface which functions as a top when the container is rotated to make the first top surface a side surface, a discharge member on a side surface with a first and a second conduit connected to the discharge member such that the second conduit extends from the discharge member in a planar relationship with the first top surface and its end is above the discharge member when the first top surfaces faces upward while the first conduit extends from the discharge member in a planar relationship with the second top surface and its end is above the discharge member when the second top surface faces upward, and sealing means for sealing any one of the first inlet, the second inlet, and the discharge member.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a perspective view, partially cut-away, of the container.

FIG. 2 is a front elevation view of the container, partially cut-away with the second top surface facing upward, illustrating the internal structure.

FIG. 3 is a plan view, partial cut-away, of the first top surface.

FIG. 4 is a front elevation view of the container, partially cut-away with the first top surface facing upward, illustrating the internal structure.

DETAILED DESCRIPTION OF THE INVENTION

Referring now to the drawings in detail and in particular to FIG. 1, reference character 10 generally designates a portable, sealable, recovery container constructed in accordance with a preferred embodiment of the present invention. It can be of any geometric shapes but preferably should be somewhat square-shaped or rectangularly-shaped for best results. A rectangular shape, akin to a suitcase, with an inlet on the broadest surface and another inlet on a smaller surface is best for versatility of use.

In FIG. 1, the container 10 has six surfaces referenced by numerals 11–16. A first top surface 11 has a first inlet 21 (shown sealed with a cap or cover 24) into which a mixture containing an industrial solution (or water) and an effluent (or undesirable product) is introduced into the container when the first inlet 21 is uncapped. In this position, the container has a first bottom 13 and four sides 12, 14, 15, 16. Side 12 is a second top surface which has a second inlet 22. In the position illustrated in FIG. 1, the second inlet 22 is sealed with a cap or cover 26.

A discharge member 30 is connected to a side 15. As illustrated here, the discharge member 30 has two conduits attached at its junction; a first conduit 31 which is somewhat parallel or planar to a side surface 12 (also referred to as the second top surface) and a second conduit 32 which is somewhat parallel or planar to the first top surface 11. The first conduit 31 extends somewhat downward from the discharge member 30 toward the first bottom surface 13. The open end 41 of the first conduit 31 is adjacent to the first bottom surface 13. The first conduit 31 functions as a fluid-flow conduit for the usable solution 38.

The second conduit 32 extends from the discharge member 30 somewhat parallel or planar to the first top surface 11 toward the second bottom surface 14. The open end 42 of the second conduit 32 is adjacent to the second bottom surface 14. As so positioned, the open end 42 of the second conduit 32 is higher than the discharge member 30 and functions as an air vent.

Reference is not made to FIGS. 1 and 4. In this position, when the mixture is introduced into the container 10, has had time to separate with the undesirable effluent 37 rising to the top and the re-usable solution 38 remaining below the undesirable effluent level 40, and the overall level 39 is above the discharge member 30 but below the open end 42 of the second conduit 32, gravity forces the usable solution 38 to enter the open end 41 of the first conduit 31, move up the first conduit 31, and out the discharge member 30.

The process continues until the undesirable effluent level 40 contacts the open end 41 of the first conduit 31 and undesirable effluent 37 begins flowing from the discharge member 30. At this point, no further mixture is introduced into the container 10, the first inlet 21 is sealed with a cap 24, and the discharge member is sealed with a cap 34 (shown in FIG. 3). The container 10 can be easily removed, cleaned, and returned for continued use or it can be replaced with a previously cleaned container and operations continued virtually uninterrupted. A carry handle 19 facilitates handling and carrying the container 10.

FIG. 2 illustrates use of the container 10 with the first top section 11 rotated in the direction of Arrow A (FIG. 1) or approximately 90° clockwise from its position illustrated in FIG. 1. In this position, the second top section 12 now faces upward and becomes the real top. The second inlet 22 is uncapped and the mixture is introduced into the container. The first inlet 21 on the first top section 11, which now is a side section, is sealed with a cap device 24. In this position, the first conduit 31, having its open end 41 above the discharge member 30, functions as the air vent, and the second conduit 32, having its open end 42 adjacent to the second bottom 14, functions as the fluid-flow conduit for the usable solution 38. With the overall level 39 above the discharge member 30 but below the air vent (the open end 41 of the first conduit 31), usable solution 38 flows into the open end 42 of the second conduit 32, up the second conduit 32, and out the discharge member 30. As described above, when the effluent level 40 contacts the open end 42 of the second conduit 32, the undesirable effluent 27 flows up the second conduit 32 and out the discharge member 30. When this is detected the container 10 is sealed, removed, and either replaced by a previously cleaned container or cleaned and returned to operation.

It should be understood that any suitable sealing mechanism may be used to seal the first inlet 21, the second inlet 22, and the discharge member 30. Such mechanisms may include, but are not limited to, a threaded cap or cover which is threadable onto corresponding threads 25, 27, 35 on the first inlet 21, the second inlet 22, and the discharge member 30, respectively, friction-fitting caps or covers, or internally fitting plugs which are insertable into openings of the first inlet 21, the second inlet 22, and the discharge member 30. The purpose here is to seal the container and permit its transportation without spilling any portion of the contents.

What makes the present invention versatile is its dual position operation. From one top 11, 12 to its respective corresponding bottom 13, 14 a first height of the container can be short while the other second height can be tall, or both heights can be equal, or the heights can be any variation thereof. Provided a designated top, first top section 11 or second top section 12, faces upwards, the container can be fitted into limited spaces and will properly function. The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiment[s] illustrated, but by the appended claims and their legal equivalents.

The invention claimed is:

1. A portable sealable recovery container comprising:
   a. a plurality of surfaces attached together such that a sealed interior space is defined within;
   b. a first inlet on a first top surface;
   c. a second inlet on a second top surface, said second top surface establishable as a true top surface with the rotation of said container such that said first top surface becomes a side surface;
   d. a discharge member on a side surface;
   e. at least two conduits in the interior space, said at least two conduits connected to said discharge member such that a first conduit extends from said discharge member in a planar relationship with said first top surface and a second conduit extends from said discharge member in a planar relationship with said second top surface; and
   f. sealing means for sealing any one of said first inlet, said second inlet, and said discharge member.

2. The container as defined in claim 1 wherein said sealing means comprises a cap with threads and corresponding threading on said first inlet, said second inlet, and said discharge member.

3. The container as defined in claim 1 wherein said first conduit has an end which is structured above the discharge member when said first top faces upward and said second conduit has an end which is adjacent to a first bottom and then functions as a fluid discharge conduit while said first conduit functions as an air relief member.

4. The container as defined in claim 1 wherein said second conduit has an end which is structured above the discharge member when said second top faces upward and said first conduit has an end which is adjacent to a second bottom and then functions as a fluid discharge conduit while said second conduit functions as an air relief member.

5. The container as defined in claim 1 further comprising a carry handle on said container.

6. The container as defined in claim 5 wherein said carry handle is positioned at a point where said first top surface and said second top surface are joined.

\* \* \* \* \*